United States Patent
Park et al.

(10) Patent No.: US 9,670,994 B2
(45) Date of Patent: Jun. 6, 2017

(54) PLANETARY GEAR TRAIN OF AUTOMATIC TRANSMISSION FOR VEHICLE

(71) Applicant: Hyundai Motor Company, Seoul (KR)

(72) Inventors: JongSool Park, Hwaseong-si (KR); Sueng Ho Lee, Seoul (KR); Dong Hwan Hwang, Seoul (KR); Seong Wook Hwang, Gunpo-si (KR); Seongwook Ji, Ansan-si (KR); Wonmin Cho, Hwaseong-si (KR); Hyun Sik Kwon, Seoul (KR); KyeongHun Lee, Seoul (KR); Jong Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/947,948

(22) Filed: Nov. 20, 2015

(65) Prior Publication Data
US 2017/0074366 A1    Mar. 16, 2017

(30) Foreign Application Priority Data
Sep. 14, 2015 (KR) .................. 10-2015-0129864

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC ..... F16H 2200/0065; F16H 2200/2012; F16H 2200/2046; F16H 3/66
See application file for complete search history.

(56) References Cited

U.S. PATENT DOCUMENTS

| 2012/0053004 | A1* | 3/2012 | Beck .................... F16H 3/66 475/275 |
| 2012/0149525 | A1 | 6/2012 | Gumpoltsberger et al. |
| 2014/0179487 | A1* | 6/2014 | Thomas ................. F16H 3/62 475/275 |

FOREIGN PATENT DOCUMENTS

JP          2013-190048 A     9/2013

* cited by examiner

*Primary Examiner* — Erin D Bishop
(74) *Attorney, Agent, or Firm* — Morgan Lewis & Bockius LLP

(57) ABSTRACT

A planetary gear train of an automatic transmission for a vehicle may include: an input shaft which receives power from an engine; an output shaft which outputs power changed in speed; a first planetary gear set which has first, second, and third rotating elements; a second planetary gear set which has fourth, fifth, and sixth rotating elements; a third planetary gear set which has seventh, eighth, and ninth rotating elements; a fourth planetary gear set which has tenth, eleventh, and twelfth rotating elements; and six control elements wherein one of the six control elements is disposed at a portion where one of the first to twelfth rotating elements is selectively connected to another of the first to twelfth rotating elements, or at a portion where the one of the first to twelfth rotating elements is selectively connected to the transmission housing.

6 Claims, 2 Drawing Sheets

FIG. 2

| Speed | Control elements | | | | | | Gear ratio | Inter-stage ratio between neighboring gear shift stages | Span of gear shift ratio |
|---|---|---|---|---|---|---|---|---|---|
| | B1 | B2 | C1 | C2 | C3 | C4 | | | |
| D1 | ● | | ● | | | ● | 4.511 | | 9.2. (Tunable) |
| D2 | ● | | | | ● | ● | 2.799 | 1.612 | |
| D3 | ● | | ● | | ● | | 1.932 | 1.449 | |
| D4 | ● | | ● | ● | | | 1.366 | 1.414 | |
| D5 | | | ● | ● | ● | | 1.000 | 1.366 | |
| D6 | | ● | ● | ● | | | 0.797 | 1.255 | |
| D7 | | ● | | ● | ● | | 0.695 | 1.147 | |
| D8 | | ● | ● | | ● | | 0.559 | 1.243 | |
| D9 | | ● | | | ● | | 0.488 | 1.145 | |
| REV | ● | ● | ● | | | | -3.820 | | — |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0129864 filed on Sep. 14, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle which is capable of implementing at least nine forward speeds using a minimum number of configurations, improving power transmission performance and fuel efficiency by increasing a span of a gear shift ratio, and ensuring uniformity of an inter-stage ratio between neighboring gear shift stages.

Description of Related Art

The recent increase in oil prices causes carmakers to meet global demands of improving fuel efficiency.

Accordingly, researches are being conducted on engines in terms of reducing weight and improving fuel efficiency by down-sizing, and researches are also being conducted to ensure both drivability and competitiveness by maximizing fuel efficiency by implementing an automatic transmission with multiple stages.

However, in the case of the automatic transmission, the number of internal components is increased as the number of gear shift stages is increased, which may cause deterioration in terms of mountability, production costs, weight, and power transmission efficiency.

Therefore, in order to increase an effect of improving fuel efficiency by implementing an automatic transmission with multiple stages, it is important to develop a planetary gear train capable of maximizing efficiency using a small number of components.

In this respect, recently, an eight-speed automatic transmission has been implemented, and research and development is being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

Further, because it is impossible to ensure linearity of inter-stage ratios between neighboring gear shift stages in a case in which a span of a gear shift ratio in the case of the eight-speed automatic transmission is increased to 9.0 or more, driving efficiency of the engine and drivability of the vehicle deteriorate.

Accordingly, there is a need for development of a highly efficient automatic transmission with the gear shift stages for nine or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle which is capable of implementing gear shift stages for at least nine forward speeds and one reverse speed using a minimum number of configurations, improving power transmission performance and fuel efficiency by increasing a span of a gear shift ratio, and ensuring linearity of inter-stage ratios between neighboring gear shift stages.

A planetary gear train of an automatic transmission for a vehicle may include: an input shaft which receives power from an engine; an output shaft which outputs power changed in speed; a first planetary gear set which has first, second, and third rotating elements; a second planetary gear set which has fourth, fifth, and sixth rotating elements; a third planetary gear set which has seventh, eighth, and ninth rotating elements; a fourth planetary gear set which has tenth, eleventh, and twelfth rotating elements; and six control elements being disposed at a portion where one of the rotating element is selectively connected to another rotating element, or the rotating element is selectively connected to the transmission housing. The input shaft is continuously connected to the second rotating element, the output shaft is continuously connected to the eleventh rotating element, the third rotating element is continuously connected to the fifth rotating element and the eighth rotating element, the sixth rotating element is continuously connected to the tenth rotating element, the ninth rotating element is continuously connected to the eleventh rotating element, and the sixth rotating element is selectively connected to the transmission housing, wherein gear shift stages for at least nine forward speeds and at least one reverse speed are implemented by operations of three control elements among the six control elements.

Further, the fourth rotating element is selectively connected to the transmission housing, the input shaft is selectively connected to the seventh rotating element, the input shaft is selectively connected to the twelfth rotating element, the first rotating element is selectively connected to the fourth rotating element, and the fourth rotating element is selectively connected to the seventh rotating element.

Further, the first, second, and third rotating elements of the first planetary gear set are a sun gear, a planet carrier, and a ring gear, respectively, the fourth, fifth, and sixth rotating elements of the second planetary gear set are a sun gear, a planet carrier, and a ring gear, respectively, the seventh, eighth, and ninth rotating elements of the third planetary gear set are a sun gear, a planet carrier, and a ring gear, respectively, the tenth, eleventh, and twelfth rotating elements of the fourth planetary gear set are a sun gear, a planet carrier, and a ring gear, respectively.

According to an exemplary embodiment of the present invention, it is possible to implement the gear shift stages for at least nine forward speeds and one reverse speed, by combining the four planetary gear sets, which are simple planetary gear sets, as six control elements.

In addition, a span of a gear shift ratio is 9.0 or more, thereby maximizing driving efficiency of the engine.

In addition, the uniformity of the inter-stage ratio between neighboring gear shift stages is secured while multi-staging the gear shift stage at high efficiency, thereby making it possible to improve drivability such as acceleration before and after the shift, an engine speed rhythmic sense, and the like.

Effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table representing operations at respective gear shift stages implemented by respective control elements applied to the planetary gear train according to the exemplary embodiment of the present invention.

Figure 1:
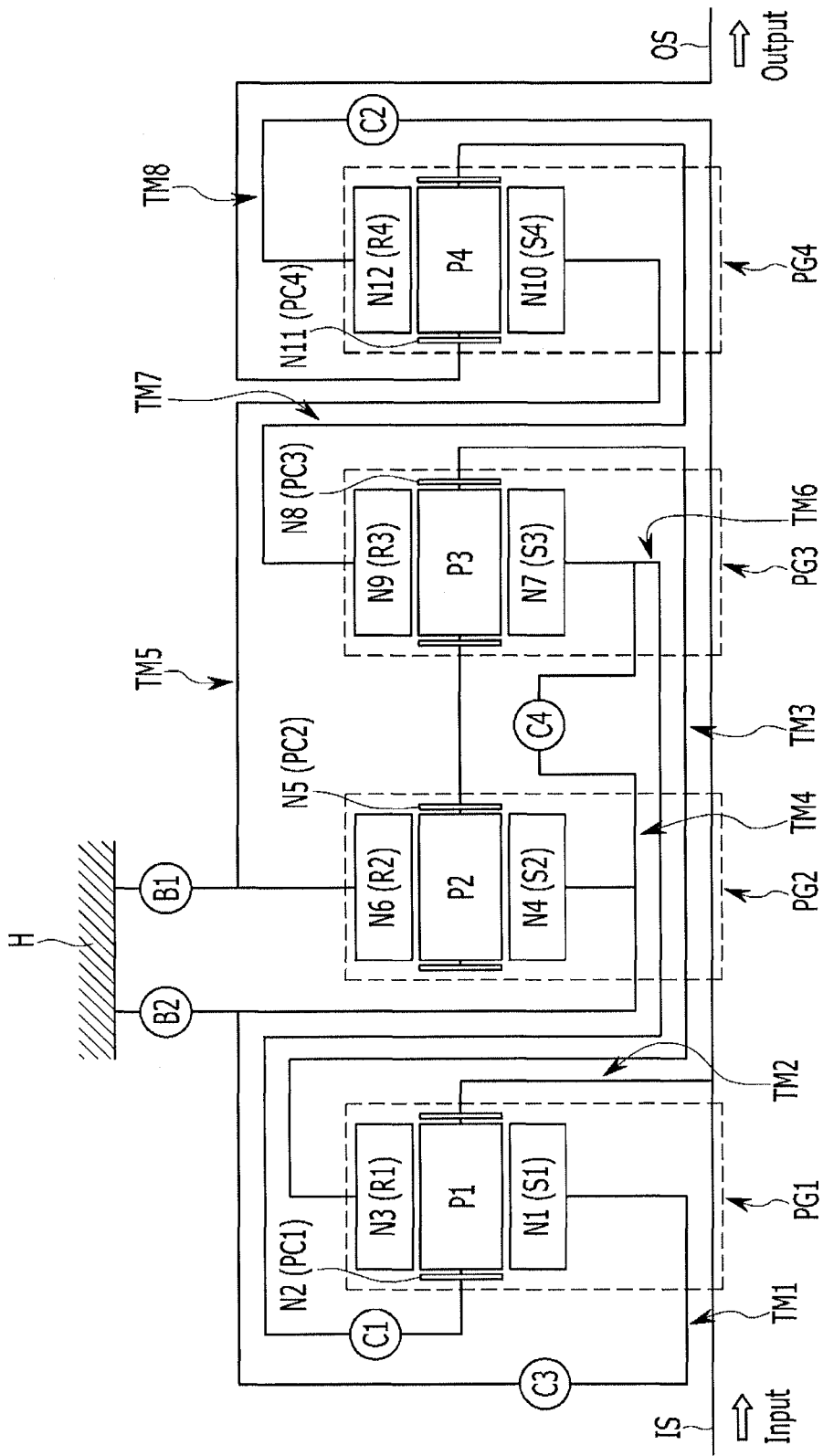
FIG. 1 is a configuration diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

However, parts irrelevant to the description will be omitted to clearly describe the exemplary embodiments of the present invention, and the same or similar constituent elements will be designated by the same reference numerals throughout the specification.

In the following description, names of constituent elements are classified as a first, a second, and the like so as to discriminate the constituent elements having the same name, and the names are not necessarily limited to the order.

FIG. 1 is a configuration diagram of a planetary gear train according to an exemplary embodiment of the present invention.

Referring to FIG. 1, the planetary gear train according to the exemplary embodiment of the present invention includes first, second, third, and fourth planetary gear sets PG1, PG2, PG3, and PG4 which are coaxially disposed, an input shaft IS, an output shaft OS, eight rotating shafts TM1 to TM8 which directly connect respective rotating elements of the first, second, third, and fourth planetary gear sets PG1, PG2, PG3, and PG4, six control elements C1 to C3 and B1 to B2, and a transmission housing H.

Further, rotational power inputted from the input shaft IS is changed in speed by complementary operations of the first, second, third, and fourth planetary gear sets PG1, PG2, PG3, and PG4, and then outputted through the output shaft OS.

The respective simple planetary gear sets are disposed in the order of the first, second, third, and fourth planetary gear sets PG1, PG2, PG3, and PG4 from an engine.

The input shaft IS is an input member, rotational power from a crankshaft of the engine is converted into torque by a torque converter, and the torque is inputted.

The output shaft OS is an output member, and is disposed coaxially with the input shaft IS to transmit the driving power, which is changed in speed, to a driving shaft through a differential apparatus.

The first planetary gear set PG1 is a single pinion planetary gear set, and includes rotating elements including a first sun gear S1 which is a first rotating element N1, a first planet carrier PC1 which is a second rotating element N2 for supporting a first pinion P1 that externally engages with the first sun gear S1 that is the first rotating element N1, and a first ring gear R1 which is a third rotating element N3 that internally engages with the first pinion P1.

The second planetary gear set PG2 is a single pinion planetary gear set, and includes a second sun gear S2 which is a fourth rotating element N4, a second planet carrier PC2 which is a fifth rotating element N5 for supporting a second pinion P2 that externally engages with the second sun gear S2 that is the fourth rotating element N4, and a second ring gear R2 which is a sixth rotating element N6 that internally engages with the second pinion P2.

The third planetary gear set PG3 is a single pinion planetary gear set, and includes a third sun gear S3 which is a seventh rotating element N7, a third planet carrier PC3 which is an eighth rotating element N8 for supporting the third pinion P3 that externally engages with the third sun gear S3 that is the seventh rotating element N7, and a third ring gear R3 which is an ninth rotating element N9 that internally engages with the third pinion P3.

The fourth planetary gear set PG4 is a single pinion planetary gear set, and includes a fourth sun gear S4 which is a tenth rotating element N10, a fourth planet carrier PC4 which is an eleventh rotating element N11 for supporting the fourth pinion P4 that externally engages with the fourth sun gear S4 which is the tenth rotating element N10, and a fourth ring gear R4 which is a twelfth rotating element N12 that internally engages with the fourth pinion P4.

The first, second, third, and fourth planetary gear set PG1, PG2, PG3, and PG4 are operated while retaining the total of eight rotating shafts TM1 to TM8 in a state in which the third rotating element N3 is directly connected to the fifth rotating element N5 and the eighth rotating element N8, the sixth rotating element N6 is directly connected to the tenth rotating element N10, and the ninth rotating element N9 is directly connected to the eleventh rotating element N11.

The configurations of the eight rotating shafts TM1 to TM8 will be described below.

The first rotating shaft TM1 includes the first rotating element N1 (first sun gear S1).

The second rotating shaft TM2 includes a second rotating element N2 (first planet carrier PC1), and is directly connected to an input shaft IS so as to continuously be operated as an input element.

The third rotating shaft TM3 includes a third rotating element N3 (first ring gear R1), the fifth rotating element N5 (second planet carrier PC1), and the eighth rotating element N8 (third planet carrier PC3).

The fourth rotating shaft TM4 includes the fourth rotating element N4 (second sun gear N2), and is selectively connected to the first rotating shaft TM1 or the transmission housing H.

The fifth rotating shaft TM5 includes the sixth rotating element N6 (second ring gear R2) and the tenth rotating element N10 (fourth sun gear S4), and is selectively connected to the transmission housing H.

The sixth rotating shaft TM6 includes the seventh rotating element N7 (third sun gear S3), and is selectively connected to the second rotating shaft TM2 or the fourth rotating shaft TM4.

The seventh rotating shaft TM7 includes the ninth rotating element N9 (third ring gear R3) and the eleventh rotating element N11 (fourth planet carrier PC4), and is directly connected to the output shaft OS so as to continuously be operated an output element.

The eighth rotating shaft TM8 includes the twelfth rotating element N12 (fourth ring gear R4), and is selectively connected to the second rotating shaft TM2.

Further, the four clutches C1, C2, C3, and C4 which are control elements are disposed where the rotating shaft among the rotating shafts TM1 to TM8 are selectively connected to each other.

In addition, the two brakes B1 and B2, which are control elements, are disposed at portions where the rotating shafts among the rotating shafts TM1 to TM8 are selectively connected to the transmission housing H.

Positions at which the six control elements C1 to C4 and B1 to B2 are disposed will be described below.

The first clutch C1 is disposed between the second rotating shaft TM2 and the sixth rotating shaft TM6, and allows the second rotating shaft TM2 and the sixth rotating shaft TM6 to be selectively integrated with each other.

The second clutch C2 is disposed between the second rotating shaft TM2 and the eighth rotating shaft TM8, and allows the second rotating shaft TM2 and the eighth rotating shaft TM8 to be selectively integrated with each other.

The third clutch C3 is disposed between the first rotating shaft TM1 and the fourth rotating shaft TM4, and allows the first rotating shaft TM1 and the fourth rotating shaft TM8 to be selectively integrated with each other.

The fourth clutch C4 is disposed between the fourth rotating shaft TM4 and the sixth rotating shaft TM6, and allows the third rotating shaft TM3 and the eighth rotating shaft TM8 to be selectively integrated with each other.

The first brake B1 is interposed between the fifth rotating shaft TM5 and the transmission housing H, and allows the fifth rotating shaft TM5 to be operated as a selectively fixed element.

The second brake B2 is interposed between the fourth rotating shaft TM4 and the transmission housing H, and allows the fourth rotating shaft TM4 to be operated as a selectively fixed element.

The control elements, which include the first, second, third, and fourth clutches C1, C2, C3, and C4 and the first and second brakes B1 and B2 as described above, may be a multi-plate hydraulic frictional coupling unit that is frictionally coupled by hydraulic pressure.

FIG. 2 is a table representing operations at respective gear shift stages implemented by respective control elements applied to the planetary gear train according to the exemplary embodiment of the present invention.

As shown in FIG. 2, according to the planetary gear train according to the exemplary embodiment of the present invention, gear shift operations are carried out by operating the three control elements at respective gear shift stages.

At a gear shift stage for a first forward speed D1, the first and fourth clutches C1 and C4 and the first brake B1 are operated simultaneously. That is, a gear shift operation for the first forward speed is carried out while the second rotating shaft TM2 including the input shaft IS and the sixth rotating shaft TM6 are connected to each other by the operation of the first clutch C1, power is inputted through second rotating shaft TM2 in a state in which the fourth rotating shaft TM4 and the sixth rotating shaft TM6 are connected to each other by operation of the second clutch C4, and the fifth rotating shaft TM5 is operated as a fixed element by the operation of the first brake B1. Therefore, power is outputted through the output shaft OS including the seventh rotating shaft TM7.

At a gear shift stage for a second forward speed D2, the third and fourth clutches C3 and C4 and the first brake B1 are operated simultaneously. That is, the gear shift operation for the second forward speed is carried out while the first rotating shaft TM1 and the fourth rotating shaft TM4 are connected to each other by the operation of the third clutch C3, power is inputted through the second rotating shaft TM2 in a state in which the fourth rotating shaft TM4 and the sixth rotating shaft TM6 are connected to each other by the operation of the fourth clutch C4, and the fifth rotating shaft TM5 is operated as a fixed element by the operation of the first brake B1. Therefore, power is outputted through the output shaft OS including the seventh rotating shaft TM7.

At a gear shift stage for a third forward speed D3, the first and third clutches C1 and C3 and the first brake B1 are operated simultaneously. That is, the gear shift operation for the third forward speed is carried out while the second rotating shaft TM2 and the sixth rotating shaft TM6 are connected to each other by the operation of the first clutch C1, power is inputted through the second rotating shaft TM2 in a state in which the first rotating shaft TM1 and the fourth rotating shaft TM4 are connected to each other by the operation of the third clutch C3, and the fifth rotating shaft TM5 is operated as a fixed element by the operation of the first brake B1. Therefore, power is outputted through the output shaft OS including the seventh rotating shaft TM7.

At a gear shift stage for a fourth forward speed D4, the first and second clutches C1 and C2 and the first brake B1 are operated simultaneously. That is, the gear shift operation for the fourth forward speed is carried out while the second rotating shaft TM2 and the sixth rotating shaft TM6 are connected to each other by the operation of the first clutch C1, power is inputted through the second rotating shaft TM2 in a state in which the second rotating shaft TM2 and the eighth rotating shaft TM8 are connected to each other by the operation of the second clutch C2, and the fifth rotating shaft TM5 is operated as a fixed element by the operation of the first brake B1. Therefore, power is outputted through the output shaft OS including the seventh rotating shaft TM7.

At a gear shift stage for a fifth forward speed D5, the first, second, and third clutches C1, C2, and C3 are operated simultaneously. That is, the second rotating shaft TM2 and the sixth rotating shaft TM6 are connected to each other by the operation of the first clutch C1, the second rotating shaft TM2 and the eighth rotating shaft TM8 are connected to each other by the operation of the second clutch C2, and the first rotating shaft TM1 and the fourth rotating shaft TM4 are connected to each other by the operation of the third clutch C3, such that the first, second, third, fourth planetary gear set PG1, PG2, PG3, and PG4 are directly connected, and as a result, the gear shift operation for the fifth forward speed, which outputs the inputted power as it is, is carried out. Therefore, power is outputted through the output shaft OS including the seventh rotating shaft TM7.

At a gear shift stage for a sixth forward speed D6, the first and second clutches C1 and C2 and the second brake B2 are operated simultaneously. That is, a gear shift operation for the sixth forward speed is carried out while the second rotating shaft TM2 and the sixth rotating shaft TM6 are connected to each other by the operation of the first clutch C1, power is inputted through the second rotating shaft TM2 in a state in which the second rotating shaft TM2 and the eighth rotating shaft TM8 are connected to each other by the operation of the second clutch C2, and the fourth rotating shaft TM4 is operated as a fixed element by the operation of the second brake B2. Therefore, power is outputted through the output shaft OS including the seventh rotating shaft TM7.

At a gear shift stage for a seventh forward speed D7, the second and third clutches C2 and C3 and the second brake B2 are operated simultaneously. That is, the gear shift operation for the seventh forward speed is carried out while the second rotating shaft TM2 and the eighth rotating shaft TM8 are connected to each other by the operation of the second clutch C2, power is inputted through the second rotating shaft TM2 in a state in which the first rotating shaft TM1 and the fourth rotating shaft TM4 are connected to each other by the operation of the third clutch C3, and the fourth rotating shaft TM4 is operated as a fixed element by the operation of the second brake B2. Therefore, power is outputted through the output shaft OS including the seventh rotating shaft TM7.

At a gear shift stage for an eighth forward speed D8, the first and third clutches C1 and C3 and the second brake B2 are operated simultaneously. That is, the gear shift operation for the eighth forward speed is carried out while the second rotating shaft TM2 and the sixth rotating shaft TM6 are connected to each other by the operation of the first clutch C1, power is inputted through the second rotating shaft TM2 in a state in which the first rotating shaft TM1 and the fourth rotating shaft TM4 are connected to each other by the operation of the third clutch C3, and the fourth rotating shaft TM4 is operated as a fixed element by the operation of the second brake B2. Therefore, power is outputted through the output shaft OS including the seventh rotating shaft TM7.

At a gear shift stage for a ninth forward speed D9, the third and fourth clutches C3 and C4 and the second brake B2 are operated simultaneously. That is, a gear shift operation for the ninth forward speed is carried out while the first rotating shaft TM1 and the fourth rotating shaft TM4 are connected to each other by the operation of the third clutch C3, power is inputted through the second rotating shaft TM2 in a state in which the fourth rotating shaft TM4 and the sixth rotating shaft TM6 are connected to each other by the operation of the fourth clutch C4, and the fourth rotating shaft TM4 is operated as a fixed element by the operation of the second brake B2. Therefore, power is outputted through the output shaft OS including the seventh rotating shaft TM7.

At a reverse gear shift stage REV, the first clutch C1 and first and second brakes B1 and B2 are operated simultaneously. That is, a reverse gear shift operation is carried out while power is transmitted through the second rotating shaft TM2 in a state in which the second rotating shaft TM2 and the sixth rotating shaft TM6 are connected to each other by the operation of the first clutch C1, the fifth rotating shaft TM5 is operated as a fixed element by the operation of the first brake B1, and the fourth rotating shaft TM4 is operated as a fixed element by the operation of the second brake B2. Therefore, power is outputted through the output shaft OS including the seventh rotating shaft TM7.

The planetary gear train according to the exemplary embodiment of the present invention may implement the gear shift stages for at least nine forward speeds and one reverse speed by operating and controlling the four planetary gear sets PG1, PG2, PG3, and PG4 using the four clutches C1, C2, C3, and C4 and the two brakes B1 and B2.

In addition, all inter-stage ratios between neighboring gear shift stages are 1.2 or more except for 6/7 forward gear shift stages and 8/9 forward gear shift stages, while ensuring uniformity, thereby improving drivability such as acceleration before and after the gear shift operations, and a sense of rhythm of an engine speed.

In addition, a span of a gear shift ratio is 9.0 or more, thereby maximizing driving efficiency of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
   an input shaft which receives power from an engine;
   an output shaft which outputs power changed in speed;
   a first planetary gear set which has a first rotating element, a second rotating element, and a third rotating element;
   a second planetary gear set which has a fourth rotating element, a fifth rotating element, and a sixth rotating element;
   a third planetary gear set which has a seventh rotating element, an eighth rotating element, and a ninth rotating element;
   a fourth planetary gear set which has tenth, eleventh, and twelfth rotating elements;
   six control elements wherein one of the six control elements is disposed at a portion where one of the first to twelfth rotating elements is selectively connected to another of the first to twelfth rotating elements, or at a portion where the one of the first to twelfth rotating elements is selectively connected to a transmission housing;
   a first rotating shaft including the first rotating element;
   a second rotating shaft which includes the second rotating element, and is continuously directly connected to the input shaft;
   a third rotating shaft which includes the third rotating element, the fifth rotating element, and the eighth rotating element;

a fourth rotating shaft which includes the fourth rotating element, and selectively connected to the first rotating shaft or the transmission housing;
a fifth rotating shaft which includes the sixth rotating element and the tenth rotating element, and is selectively connected to the transmission housing;
a sixth rotating shaft which includes the seventh rotating element, and is selectively connected to the second rotating shaft or the fourth rotating shaft;
a seventh rotating shaft which includes the ninth rotating element and the eleventh rotating element, and is directly connected to the output shaft; and
an eighth rotating shaft which includes the twelfth rotating element, and is selectively connected to the second rotating shaft or the input shaft,
wherein the six control elements include:
  a first clutch which selectively connects the second rotating shaft and the sixth rotating shaft;
  a second clutch which selectively connects the second rotating shaft and the eighth rotating shaft;
  a third clutch which selectively connects the first rotating shaft and the fourth rotating shaft;
  a fourth clutch which selectively connects the fourth rotating shaft and the sixth rotating shaft;
  a first brake which selectively connects the fifth rotating shaft and the transmission housing; and
  a second brake which selectively connects the fourth rotating shaft and the transmission housing.

2. The planetary gear train of claim 1, wherein
the first planetary gear set is a single pinion planetary gear set in which the first rotating element is a first sun gear, the second rotating element is a first planet carrier, and the third rotating element is a first ring gear;
the second planetary gear set is a single pinion planetary gear set in which the fourth rotating element is a second sun gear, the fifth rotating element is a second planet carrier, and the sixth rotating element is a second ring gear;
the third planetary gear set is a single pinion planetary gear set in which the seventh rotating element is a third sun gear, the eighth rotating element is a third planet carrier, and the ninth rotating element is a third ring gear; and
the fourth planetary gear set is a single pinion planetary gear set in which the tenth rotating element is a fourth sun gear, the eleventh rotating element is a fourth planet carrier, and the twelfth rotating element is a fourth ring gear.

3. The planetary gear train of claim 1, wherein
gear shift stages, which are implemented by selectively operating the six control elements, include:
a first forward gear shift stage which is implemented by simultaneously operating the first and fourth clutches and the first brake;
a second forward gear shift stage which is implemented by simultaneously operating the third and fourth clutches and the first brake;
a third forward gear shift stage which is implemented by simultaneously operating the first and third clutches and the first brake;
a fourth forward gear shift stage which is implemented by simultaneously operating the first clutch and the second clutch and the first brake;
a fifth forward gear shift stage which is implemented by simultaneously operating the first, second, and third clutches;
a sixth forward gear shift stage which is implemented by simultaneously operating the first clutch and the second clutch and the second brake;
a seventh forward gear shift stage which is implemented by simultaneously operating the second and third clutches and the second brake;
an eighth forward gear shift stage which is implemented by simultaneously operating the first and third clutch and the second brake;
a ninth forward gear shift stage which is implemented by simultaneously operating the third and fourth clutches and the second brake; and
a reverse gear shift stage which is implemented by simultaneously operating the first clutch and the first and second brakes.

4. A planetary gear train of an automatic transmission for a vehicle, the planetary gear train comprising:
an input shaft which receives power from an engine;
an output shaft which outputs power changed in speed;
a first planetary gear set which is configured as a single pinion planetary gear set, and has a first rotating element, a second rotating element, and a third rotating element;
a second planetary gear set which is configured as a single pinion planetary gear set, and has a fourth rotating element, a fifth rotating element, and a sixth rotating element;
a third planetary gear set which is configured as a single pinion planetary gear set, and a seventh rotating element, an eighth rotating element, and a ninth rotating element;
a fourth planetary gear set which is configured as a single pinion planetary gear set, and has tenth, eleventh, and twelfth rotating elements;
a first rotating shaft which includes the first rotating element;
a second rotating shaft which includes the second rotating element and is directly connected to the input shaft;
a third rotating shaft which includes the third rotating element, the fifth rotating element, and the eighth rotating element;
a fourth rotating shaft which includes the fourth rotating element and is selectively connected to the first rotating shaft or a transmission housing;
a fifth rotating shaft which includes the sixth rotating element and the tenth rotating element, and is selectively connected to the transmission housing;
a sixth rotating shaft which includes the seventh rotating element and is selectively connected to the second rotating shaft or the fourth rotating shaft;
a seventh rotating shaft which includes the ninth rotating element and the eleventh rotating element, and is directly connected to the output shaft;
an eighth rotating shaft which includes the twelfth rotating element, and is selectively connected to the second rotating shaft or the input shaft;
a first clutch which selectively connects the second rotating shaft and the sixth rotating shaft;
a second clutch which selectively connects the second rotating shaft and the eighth rotating shaft;
a third clutch which selectively connects the first rotating shaft and the fourth rotating shaft;
a fourth clutch which selectively connects the fourth rotating shaft and the sixth rotating shaft;
a first brake which selectively connects the fifth rotating shaft and the transmission housing; and a second brake which selectively connects the fourth rotating shaft and the transmission housing.

5. The planetary gear train of claim 4, wherein
the first rotating element of the first planetary gear set is a first sun gear, the second rotating element of the first planetary gear set is a first planet carrier, and the third rotating element of the first planetary gear set is a first ring gear;

the fourth rotating element of the second planetary gear set is a second sun gear, the fifth rotating element of the second planetary gear set is a second planet carrier, and the sixth rotating element of the second planetary gear set is a second ring gear;

the seventh rotating element of the third planetary gear set is a third sun gear, the eighth rotating element of the third planetary gear set is a third planet carrier, and the ninth rotating element of the third planetary gear set is a third ring gear; and the tenth rotating element of the fourth planetary gear set is a fourth sun gear, the eleventh rotating element of the fourth planetary gear set is a fourth planet carrier, and the twelfth rotating element of the fourth planetary gear set is a fourth ring gear.

6. The planetary gear train of claim 4, wherein
gear shift stages, which are implemented by selectively operating the four clutches and two brakes, include:
a first forward gear shift stage which is implemented by simultaneously operating the first and fourth clutches and the first brake;
a second forward gear shift stage which is implemented by simultaneously operating the third and fourth clutches and the first brake;
a third forward gear shift stage which is implemented by simultaneously operating the first and third clutches and the first brake;
a fourth forward gear shift stage which is implemented by simultaneously operating the first clutch and the second clutch and the first brake;
a fifth forward gear shift stage which is implemented by simultaneously operating the first, second, and third clutches;
a sixth forward gear shift stage which is implemented by simultaneously operating the first clutch and the second clutch and the second brake;
a seventh forward gear shift stage which is implemented by simultaneously operating the second and third clutches and the second brake;
an eighth forward gear shift stage which is implemented by simultaneously operating the first and third clutches and the second brake;
a ninth forward gear shift stage which is implemented by simultaneously operating the third and fourth clutches and the second brake; and
a reverse gear shift stage which is implemented by simultaneously operating the first clutch and the first and second brakes.

\* \* \* \* \*